(12) United States Patent
Zhao

(10) Patent No.: US 11,521,297 B2
(45) Date of Patent: Dec. 6, 2022

(54) METHOD AND DEVICE FOR PRESENTING AR INFORMATION BASED ON VIDEO COMMUNICATION TECHNOLOGY

(71) Applicant: Sichuan Smart Kids Technology Co., Ltd., Sichuan (CN)

(72) Inventor: Weiqi Zhao, Hangzhou (CN)

(73) Assignee: SICHUAN SMART KIDS TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 17/411,291

(22) Filed: Aug. 25, 2021

(65) Prior Publication Data
US 2022/0067878 A1 Mar. 3, 2022

(30) Foreign Application Priority Data

Sep. 2, 2020 (CN) .......................... 202010911826.9

(51) Int. Cl.
*G06T 3/40* (2006.01)
*G06T 11/00* (2006.01)

(52) U.S. Cl.
CPC ................ *G06T 3/40* (2013.01); *G06T 11/00* (2013.01)

(58) Field of Classification Search
CPC .................................. G06T 3/40; G06T 11/00
See application file for complete search history.

(56) References Cited

U.S. PATENT DOCUMENTS

| 11,055,531 | B1* | 7/2021 | Maestas | G06Q 30/0283 |
|---|---|---|---|---|
| 2014/0176530 | A1* | 6/2014 | Pathre | G06T 19/20 |
| | | | | 345/419 |
| 2019/0027113 | A1* | 1/2019 | Kaine | G09G 5/006 |
| 2019/0371279 | A1* | 12/2019 | Mak | G06F 3/012 |
| 2019/0383906 | A1* | 12/2019 | Nakamura | G01S 17/10 |

FOREIGN PATENT DOCUMENTS

| CN | 105872526 A | 8/2016 |
|---|---|---|
| CN | 111580679 A | 8/2020 |
| WO | 2017117675 A1 | 7/2017 |
| WO | 2019171802 A1 | 9/2019 |

OTHER PUBLICATIONS

CN 202010911826.9—First Office Action, dated Apr. 6, 2022, 13 pages.

* cited by examiner

*Primary Examiner* — Yi Yang
(74) *Attorney, Agent, or Firm* — Getech Law LLC; Jun Ye

(57) ABSTRACT

The present invention relates to a method for presenting object information based on augmented reality (AR) glasses, including: acquiring an object image from another device through a communication connection, the object image including an object and a background; and performing zooming operation on the object image such that a size value of the object is capable of matching a current environment, where a color which the background has makes a display system of the AR glasses not display the background. Through one or more embodiments of the present invention, the presentation of AR object information may be realized without requiring other AR software on an AR glasses side, and without relying on the capability of computing and 3D rendering parts of the AR glasses device itself.

6 Claims, 4 Drawing Sheets

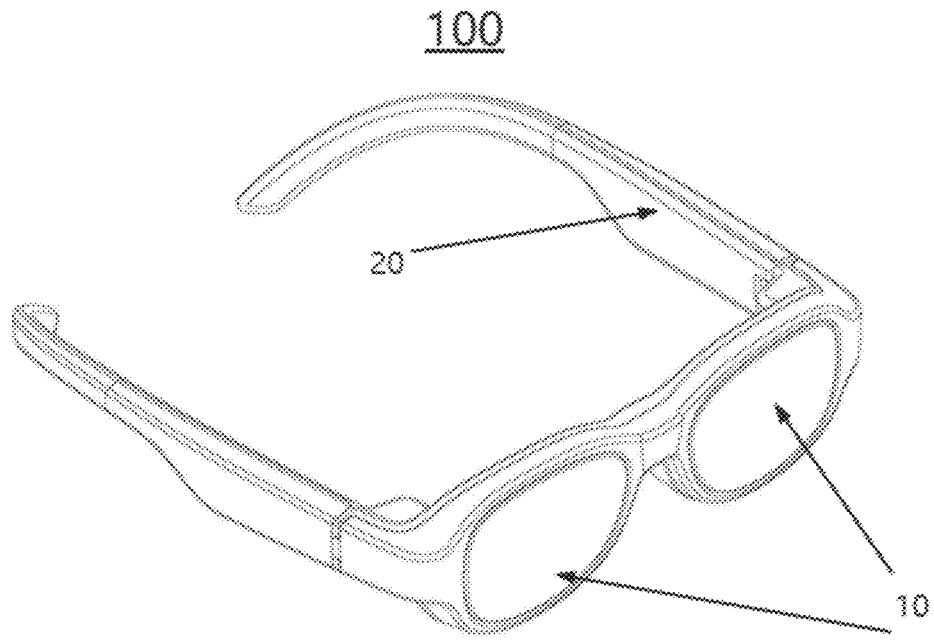

FIG. 1

```
S1: Acquire an object image from another device through a
communication connection, the object image including an object and
a background
          │
          ▼
S2: Perform zooming operation on the object image such that a size
value of the object is capable of matching a current environment
          │
          ▼
S3: Calculate a size relationship between a display device
of AR glasses and the current environment
```

FIG. 2

Sharing device           AR glasses side

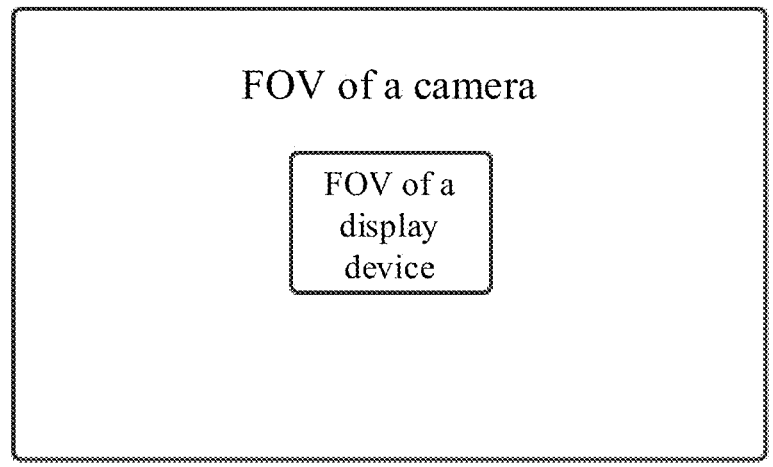
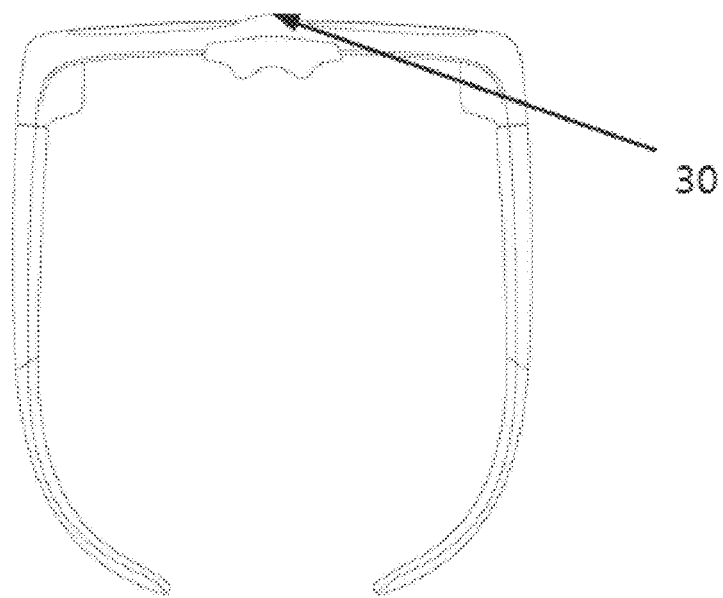
FIG. 5

METHOD AND DEVICE FOR PRESENTING AR INFORMATION BASED ON VIDEO COMMUNICATION TECHNOLOGY

TECHNICAL FIELD

The present invention relates to the field of AR information display, and in particular, to an augmented reality (AR) information display method and device based on a video communication technology.

BACKGROUND

Conventional AR information display is to experience augmented content by installing an AR application on a client side (such as AR glasses). This method has two disadvantages: 1, the AR glasses side needs to have strong data processing capabilities, which may not be perfectly adapted to lightweight AR glasses; and 2, the AR application suitable for the AR glasses side needs to be subjected to adaptation development aiming at a glasses camera and display, and it is difficult to find an AR application which supports and be adapted to all AR glasses.

SUMMARY

An objective of the present invention is to provide a method for presenting object information based on AR glasses, including: acquiring an object image from another device through a communication connection, the object image including an object and a background; and performing zooming operation on the object image, such that a size value of the object is capable of matching a current environment, where a color which the background has makes a display system of the AR glasses not display the background.

Another purpose of the present invention is to provide a pair of AR glasses, including: a display device, configured to display an object image; one or more cameras, configured to acquire current environmental information; a processor; and a memory, where the memory stores a computer program, and when the computer program is executed by the processor, the pair of AR glasses is enabled to: acquire an object image from another device through a communication connection, the object image including an object and a background; and perform zooming operation on the object image, such that a size value of the object is capable of matching a current environment, where a color which the background has makes a display system of the AR glasses not display the background.

The present invention has the advantages as follows:

the AR glasses side of the present invention does not require installation of other AR software, and does not rely on the capability of computing and 3D rendering parts of the AR glasses device itself.

The present invention may share, transmit and demonstrate AR information more conveniently through the existing mature video communication technology.

The present invention makes AR content no longer limited by devices and usage scenarios.

The present invention is not affected by individual differences in the AR glasses device.

BRIEF DESCRIPTION OF DRAWINGS

FIG. 1 shows a schematic structural diagram of AR glasses according to one or more embodiments of the present invention;

FIG. 2 shows a flowchart of a method for presenting object information based on AR glasses according to one or more embodiments of the present invention;

FIG. 5 shows a schematic diagram of a camera FOV and a display device FOV according to one or more embodiments of the present invention.

DESCRIPTION OF EMBODIMENTS

In order to further set forth the technical means and effects of the present invention to achieve the intended objectives of the invention, the specific implementations, structures, characteristics and effects of a method and device for presenting AR information based on a video communication technology, proposed in accordance with the present invention are described in detail as below with reference to the accompanying drawings and preferred embodiments.

As shown in FIG. 1, a schematic structural diagram of AR glasses 100 according to one or more embodiments of the present invention is shown. AR glasses can superimpose virtual information into the real world, such that a real world picture and a virtual picture can be superimposed together, achieving mutual complementation of the two kinds of information. It is understandable that, in some embodiments, the smart glasses 100 are other types of glasses, for example, mixed reality (MR) glasses. Those skilled in the art may understand that the form of the AR glasses of the present invention may also be in an appearance form of unconventional glasses. For example, the AR glasses may be a head-mounted device in the form of a helmet, a headgear and the like. The AR glasses 100 may include one or two display devices 10, and the display device may use a prism, an LCD, an optical waveguide, Birdbath, a free-form surface mirrors and the like, which may realize transflective display solutions. In addition, the AR glasses 100 may also include a frame 20. In some implementations, a sensor module, a processing module, a storage module, and a battery module of a smart eye may be placed inside the frame 20. In some other implementations, one or more of the sensor module, the processing module, the storage module and the battery module may also be integrated into another independent accessory (not shown in FIG. 1), and are connected to the AR glasses 100 through a data cable.

As shown in FIG. 2, a full line block diagram shows a flowchart of a method for presenting AR information according to one or more embodiments of the present invention, specifically including the following steps.

S1: Acquire an object image from another device through a communication connection, the object image including an object and a background.

S2: Perform zooming operation on the object image such that a size value of the object is capable of matching a current environment.

A color which the background has makes a display system of the AR glasses not display the background.

Figure 3:
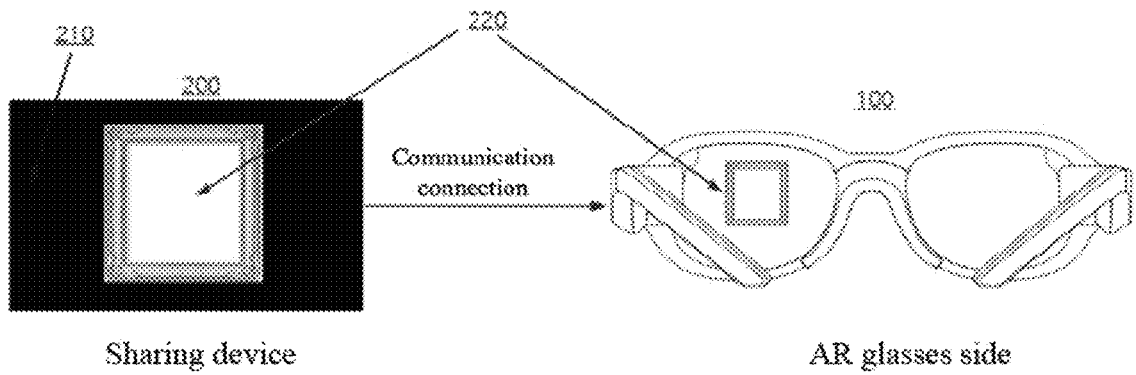
FIG. 3 shows a schematic diagram of a method for presenting object information based on AR glasses according to one or more embodiments of the present invention.

Specifically, in step S1, the communication connection is a wireless communication connection mode or a wired communication connection mode, which may be used to perform data transmission based on wireless or wired communication protocols of Wi-Fi, Bluetooth, infrared and the like. In one or more embodiments of the present invention, what is acquired from another device through the communication connection is a conventional image or image sequence. It may be understood that when a frame rate of the image sequence reaches a certain level (for example, >30 Hz), the image sequence may be in the form of a video stream, so the video stream may be transmitted through the embodiment of the present invention. In one or more embodiments of the present invention, as shown in FIG. 3, an object image 200 includes an object 220 and a background 210. The object background 210 is pure black, and the object 220 is a picture frame. In the embodiment of FIG. 3, the objective of selecting the black background is that in a display device using an OLED as a light source, the pure black background will not cause the OLED to emit light, so that any color will not be produced in the display device using the optical waveguide solution. Therefore, from the display device of the AR glasses 100, a user will see only the object information 220, that is, the picture frame in FIG. 3, but will not see the background 210. In some other embodiments of the present invention, if the display device of the AR glasses does not display white in the display principle, the background of the object image needs to be white. Therefore, in the present invention, the color of the background is not limited to the embodiment of FIG. 3, and only a color which the background of the object image has is required to make a display system of the AR glasses not display the background.

In step S2, the zooming operation may be performed on the object image according to a control instruction of a user. For example, the user may zoom in or out on the object image by means of voice interaction or touch interaction. For example, the user may zoom in on the object image by any percentage through a preset zooming-in instruction, so that the user may match the size value of the object to the current environment. In one or more embodiments, matching the current environment refers to displaying the object image acquired by the AR glasses according to the size that the user is satisfied with, or according to the size that the object image should actually have. For example, for the picture frame in FIG. 3, when the user observes the picture frame through the AR glasses 100, an FOV of the display device may be observed by facing a wall where the picture frame is desired to be placed, and the user may perform zooming on the picture frame through a built-in interaction manner of the AR glasses 100, and the user may zoom in or out on the picture frame to a satisfactory position. Thus, the user may simulate the effect of placing the picture frame without the actual object. In another embodiment, the object image received by the AR glasses 100 may be an image sequence, and the image sequence may include rotation, change, or alternative images of the object 220, so that the user of the AR glasses 100 may observe the display effect of the object 220 relative to the environment from various dimensions, without the need for local rendering or calculation of the AR glasses 100, thereby achieving a 3D presentation effect of the object. In this process, the part of the background 210 of the picture 200 should always keep black, so that the AR glasses do not display the background and do not affect the observation of the object by an AR glasses user.

Figure 4:
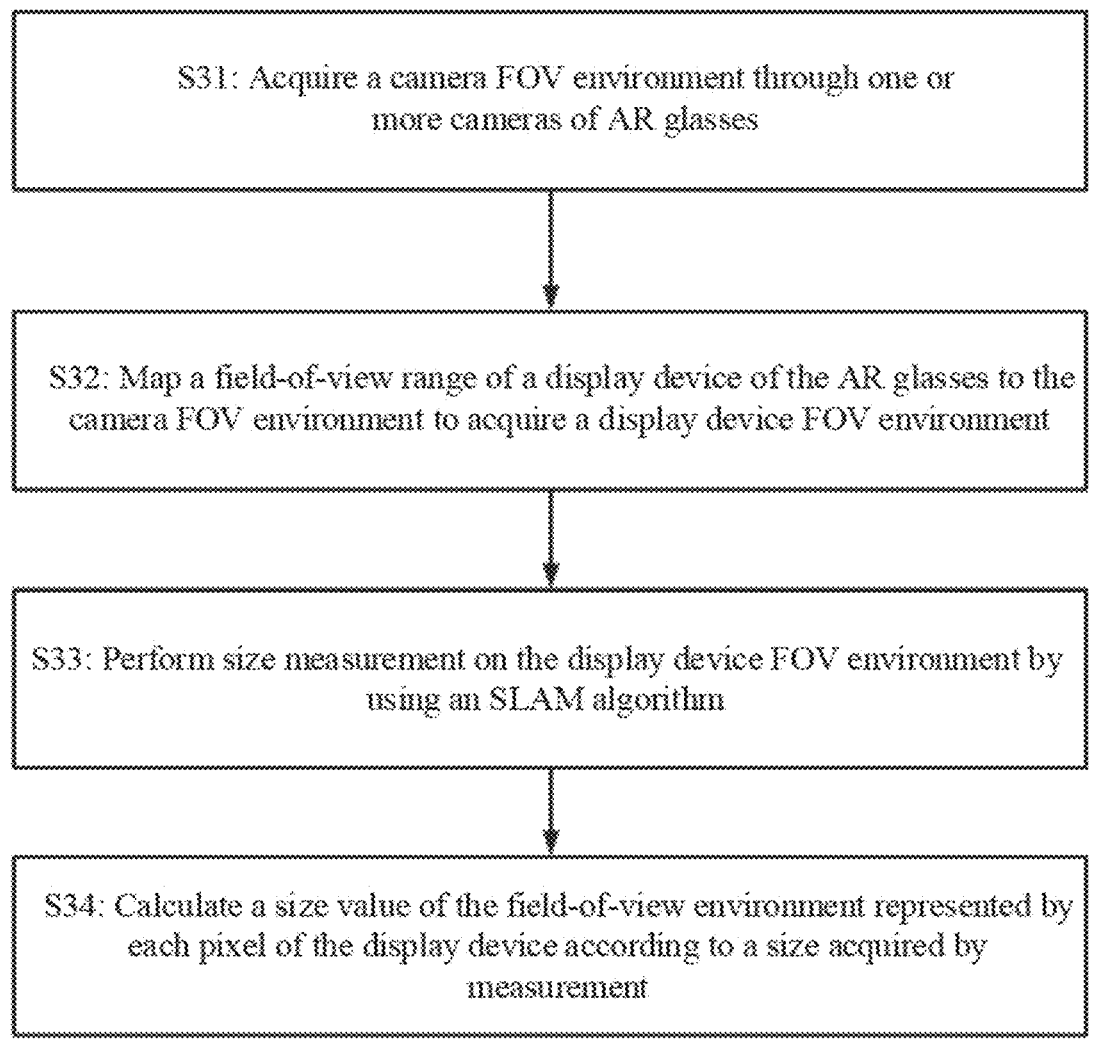
FIG. 4 shows a flowchart of a method for presenting object information based on AR glasses according to one or more embodiments of the present invention.

In one or more preferred implementations of the present invention, as shown by a dashed frame in FIG. 1, the method for presenting object information based on AR glasses also includes step S3: calculating the size relationship between a display device of the AR glasses and the current environment. The specific implementation steps of the step S3 are shown in FIG. 4:

S31: Acquire a camera FOV environment through one or more cameras of the AR glasses.

S32: Map a field-of-view range of the display device of the AR glasses to the camera FOV environment to acquire a display device FOV environment.

S33: Perform size measurement on the display device FOV environment by using an SLAM algorithm.

S34: Calculate a size value of the field-of-view environment represented by each pixel of the display device according to a size acquired by measurement.

Specifically, in step S31, one or more cameras of the AR glasses may include an RGB camera, a depth camera, an infrared camera and the like. The configuration difference of the number and type of the cameras of the AR glasses may affect the selection of the SLAM algorithm in step S33, and the SLAM algorithm will be described in detail hereinafter for step S33. As shown in FIG. 5, in an embodiment, a camera 30 of the AR glasses 100 is arranged at the middle position of two lenses of the AR glasses. The camera of the AR glasses has a certain field of view (FOV), which may photograph an actual environment in front of a wearer of the AR glasses. The FOV of the camera may be different according to the model selection difference of the camera. For example, for a non-wide-angle camera, the FOV may be a value of 70°, 85°, 90°, or 100°, or the like and for a wide-angle camera, the FOV may be greater than a value of 120°, 140°, etc. A larger camera FOV indicates a larger range of the environment which the camera may capture.

In step S32, since the display device of the AR glasses is directly arranged in front of human eyes, the display device of the AR glasses also has a certain FOV, and the FOV of the display device is relative to the human eyes. A larger FOV of the display device indicates a larger display range which the user may see. A typical value of the FOV of the display device of current AR glasses may be 20°, 40°, 60°, 80°, etc. Generally speaking, the FOV of the AR glasses display device is smaller than the FOV of the camera. Therefore, it can be understood that the environment corresponding to the FOV of the AR glasses display device generally falls into the environment of the camera FOV. As shown in FIG. 5, the FOV of the display device falls within the FOV range of the camera. Generally speaking, the positions of the display device and the camera of the AR glasses are relatively fixed. Under default camera parameters, the contents of the FOV of the display device of the AR glasses and the FOV of the camera are relatively fixed. Thus, when the camera of the AR glasses takes a picture of the environment, the part of the environment in the FOV of the display device may be determined according to the relative position.

In step S33, size measurement is performed on the environment of the FOV of the display device by using the SLAM algorithm, and SLAM calculation may be performed only in or around a range displayed by the picture, reducing the workload of the processor, thereby improving the calculation efficiency. The specific SLAM algorithm may be different according to different configuration of the camera. For example, one or more of a monocular vision measurement algorithm, a binocular vision measurement algorithm and a structured light vision measurement algorithm may be used. For example, in one of the embodiments, when only one RGB camera is used, the monocular vision measurement algorithm may be used to perform size measurement on the environment. Specifically, an inertial measurement unit (IMU) on the AR glasses may be integrated through a visual inertial system (VIO) on the AR glasses to track posture changes of the user, and fuse an image captured by the camera of the AR glasses with IMU data, thereby acquiring the size of the environment. For example, in another embodiment, if the AR glasses include multiple RGB cameras, through images acquired by the multiple cameras, feature points acquired by the camera images as well as the difference and relationships among the feature points are tracked according to the distance between lens positions of the cameras, thereby generating a 3D mapping on a physical space. The distance from one point to another point may be calculated, and the physical distance in the real world may be restored, thereby acquiring the scale of the environment. In yet another embodiment, if the AR glasses include a depth camera, depth information may be directly acquired through the depth camera, which helps a VIO system to better acquire feature points and perform environment scale restoring.

In step S34, since the resolution of the AR glasses display device is fixed, according to the size value of the FOV environment acquired in step S33, the size value in the field-of-view environment, represented by each pixel in the display device, may be calculated. For example, it is assumed that the resolution of the display device of the AR glasses is 1920 (Y axis)*1080 (X axis), and the size of the FOV acquired in a horizontal direction X is 1.08 meters, then a size value represented by each pixel on the X axis is 1 mm. It is understandable that, in steps S31 to S34, limited by the processing performance and hardware configuration of the AR glasses, very high requirements on the accuracy of a result acquired in the step S34 are not needed, and the accuracy only needs to meet daily needs of the AR glasses user. For example, in case of simulating a furniture placement effect, when a furniture scale is about 1 m, the accuracy of the size measurement may meet the need of the user within 5% or 10%. Therefore, through an SLAM algorithm of one RGB camera or multiple RBG cameras or depth cameras may well meet the technical effects of the present invention.

In one or more embodiments of the present invention, an object size value of one or more dimensions of the object relative to the display device FOV environment may be calculated according to the number of pixels occupied by one or more dimensions of the object on the display device. Specifically, for example, on the X axis, the pixels occupied by the object are 500 pixels. If the size value represented by each pixel calculated in step S34 is 1 mm, then the size value of the object on the X axis may be calculated as 0.5 meter. In some embodiments, due to the complexity of the FOV environment, the size represented by the pixels in one dimension may not be a fixed value, and the size of all the pixels of the object in the dimension may be calculated by means of integrating. In some preferred embodiments, the size value of the object in one or more dimensions may be displayed on the display device, so that the user may observe the size value of the current object relative to the environment in real time.

In one or more embodiments of the present invention, the actual size value of the object in one or more dimensions may also be acquired through a communication connection, and zooming operation is performed on the image according to the actual size value, such that the actual size value of the object matches the current environment. For example, for a picture frame as shown in FIG. 3, values of the length and width of the picture frame may be together transmitted to the AR glasses during an image transmission process, and thus the AR glasses may perform zooming on the image according to the actual size value of the picture frame, such that the size of the image displayed in the current environment is capable of matching the actual size value. In this embodiment, it is particularly suitable for simulated placement of items such as home furnishings and decorations in a space through AR glasses, providing a virtual placement effect for the purchase of a user, thereby helping the user to make a shopping decision.

Specifically, matching may be performed through the following steps.

S41: Acquire the display position of the object in a display system of AR glasses.

S42: Calculate the number of pixels occupies by the object in one or more dimensions of the display position.

S43: Calculate an estimated size value of the object at the display position according to a size value represented by each pixel.

S44: Perform zooming on the object image according to a ratio of the actual size value to the estimated size value.

Figure 6:
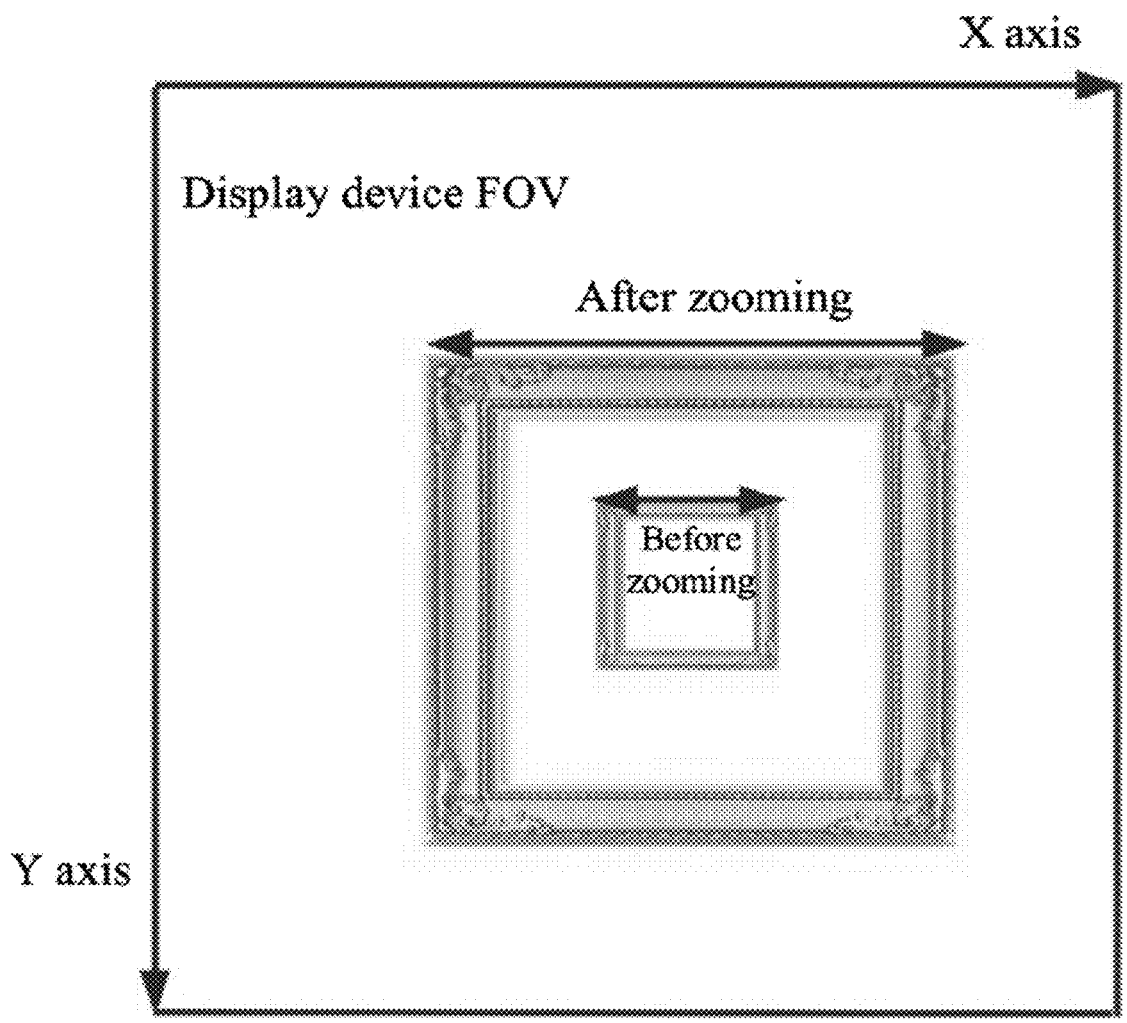
FIG. 6 shows a schematic zooming diagram of an object according to one or more embodiments of the present invention.

The above-mentioned steps are explained below with reference to FIG. 6. It is assumed that the picture frame in FIG. 6 occupies 300 pixels on the X axis before zooming, and the size represented by the pixels is 0.3 m. If the size of the currently displayed picture frame on the X axis, acquired by the AR glasses through the communication connection from a server, is 1 m, after the AR glasses receive the size value, the number of pixels that the picture frame should actually be on the X axis may be calculated as 1000, and therefore the AR glasses may zoom in on the picture frame at a ratio of 1000:300, so that the picture frame is capable of matching the actual environment.

According to another aspect of the present invention, one or more embodiments of the present invention also disclose a pair of AR glasses, the AR glasses including: a display device, configured to display an object image; one or more cameras, configured to acquire current environmental information; a processor; and a memory, where the memory stores a computer program, and when the computer program is executed by the processor, the pair of AR glasses is enabled to: acquire an object image from another device through a communication connection, the object image including an object and a background; and perform zooming operation on the object image such that a size value of the object is capable of matching a current environment, where a color which the background has makes a display system of the AR glasses not display the background.

Furthermore, the AR glasses according to one or more embodiments of the present invention may also realize various steps as in the foregoing one or more embodiments and achieve the technical effect of the foregoing steps, which is not repeated herein.

The above is only preferred embodiments of the present invention and is not intended to limit the present invention in any form. Although the present invention has been disclosed above by the preferred embodiments, the embodiments are not intended to limit the present invention. Any person skilled in the art may make some changes or modifications to implement equivalent embodiments with equivalent changes by using the technical contents disclosed above without departing from the scope of the technical solution of the present invention. Any simple modification, equivalent change and modification made to the foregoing embodiments according to the technical essence of the present invention without departing from the content of the technical solution of the present invention shall fall within the scope of the technical solution of the present invention.

What is claimed:

1. A method for presenting object information based on augmented reality (AR) glasses, comprising:
- acquiring an object image from another device through a communication connection, the object image comprising an object and a background;
- performing zooming operation on the object image such that a size value of the object is capable of matching a current environment, wherein a color of the background makes a display system of the AR glasses not display the background;
- calculating a size relationship between a display device of the AR glasses and the current environment, wherein the calculating includes:
  - acquiring a camera FOV environment through one or more cameras of the AR glasses;
  - mapping a field-of-view range of the display device of the AR glasses into the camera FOV environment to acquire a display device FOV environment;
  - performing size measurement on the display device FOV environment by using an SLAM algorithm; and
  - calculating a size value of the field-of-view environment represented by each pixel of the display device according to a size acquired by measurement;
- calculating an object size value of one or more dimensions of the object relative to the display device FOV environment according to the number of pixels occupied by the one or more dimensions of the object on the display device; and
- displaying the size value of the object in one or more dimensions on the display device.

2. The method according to claim 1, wherein the performing zooming operation on the object image such that a size value of the object is capable of matching a current environment further comprises:
- performing the zooming operation on the object image according to a control instruction of a user, such that the size value of the object is capable of matching the current environment.

3. The method according to claim 1, wherein the SLAM algorithm comprises: a monocular vision measurement algorithm, a binocular vision measurement algorithm and a structured light vision measurement algorithm.

4. The method according to claim 1, wherein the performing zooming operation on the object image such that a size value of the object is capable of matching a current environment further comprises:
- acquiring an actual size value of the object in one or more dimensions through a communication connection; and
- performing the zooming operation on the image according to the actual size value such that the actual size value of the object matches the current environment.

5. The method according to claim 4 further comprises:
- acquiring a display position of the object in a display system of the AR glasses;
- calculating the number of pixels which the object occupies in one or more dimensions of the display position;
- calculating an estimated size value of the object at the display position according to the size value represented by each pixel; and
- performing zooming on the object image on the basis of a ratio of the actual size value to the estimated size value.

6. A pair of AR glasses, comprising:
- a display device, configured to display an object image;
- one or more cameras, configured to acquire current environmental information;
- a processor; and
- a memory, wherein the memory stores a computer program, and when the computer program is executed by the processor, the pair of AR glasses is configured to:
- acquire an object image from another device through a communication connection, the object image comprising an object and a background;
- perform zooming operation on the object image such that a size value of the object is capable of matching a current environment, wherein a color of the background makes a display system of the AR glasses not display the background,
- calculate a size relationship between a display device of the AR glasses and the current environment by:
  - acquiring a camera FOV environment through one or more cameras of the AR glasses;
  - mapping a field-of-view range of the display device of the AR glasses into the camera FOV environment to acquire a display device FOV environment;
  - performing size measurement on the display device FOV environment by using an SLAM algorithm; and
  - calculating a size value of the field-of-view environment represented by each pixel of the display device according to a size acquired by measurement,
- calculate an object size value of one or more dimensions of the object relative to the display device FOV environment according to the number of pixels occupied by the one or more dimensions of the object on the display device; and
- display the size value of the object in one or more dimensions on the display device.

* * * * *